(12) United States Patent
Akula et al.

(10) Patent No.: US 12,429,222 B2
(45) Date of Patent: Sep. 30, 2025

(54) FLEX FUEL COMBUSTOR

(71) Applicant: GE Infrastructure Technology LLC, Greenville, SC (US)

(72) Inventors: Rajani Kumar Akula, Bengaluru (IN); Juergen Gerhard Hoffmann, Baden (CH); Michael John Hughes, State College, PA (US)

(73) Assignee: GE Vernova Infrastructure Technology LLC, Greenville, SC (US)

( * ) Notice: Subject to any disclaimer, the term of this patent is extended or adjusted under 35 U.S.C. 154(b) by 0 days.

(21) Appl. No.: 18/455,749

(22) Filed: Aug. 25, 2023

(65) Prior Publication Data
US 2025/0067437 A1   Feb. 27, 2025

(51) Int. Cl.
   *F23R 3/34*   (2006.01)
   *F02C 7/22*   (2006.01)
   *F23R 3/28*   (2006.01)

(52) U.S. Cl.
   CPC .................. *F23R 3/34* (2013.01); *F02C 7/22* (2013.01); *F23R 3/286* (2013.01); *F05D 2240/35* (2013.01)

(58) Field of Classification Search
   CPC .... F23R 3/34; F23R 3/346; F23R 3/36; F23R 3/10; F23R 3/14; F23R 3/286; F02C 7/22
   See application file for complete search history.

(56) References Cited

U.S. PATENT DOCUMENTS

| | | | |
|---|---|---|---|
| 4,373,325 A | 2/1983 | Shekleton | |
| 4,845,940 A | 7/1989 | Beer | |
| 5,487,275 A * | 1/1996 | Borkowicz | F23C 6/047 60/747 |
| 5,996,351 A * | 12/1999 | Feitelberg | F23R 3/06 60/754 |
| 6,868,676 B1 * | 3/2005 | Haynes | F23R 3/20 60/776 |
| 7,284,378 B2 | 10/2007 | Amond, III et al. | |
| 8,457,861 B2 | 6/2013 | Davis, Jr. et al. | |

(Continued)

FOREIGN PATENT DOCUMENTS

| JP | 2023039683 A | 3/2023 |
|---|---|---|
| WO | WO2019088107 A1 | 5/2019 |

OTHER PUBLICATIONS

International Search Report Corresponding to Application No. PCT/US2024/042989 on Dec. 2, 2024.

(Continued)

*Primary Examiner* — Andrew H Nguyen
(74) *Attorney, Agent, or Firm* — Dority & Manning, P.A.

(57) ABSTRACT

Combustors and methods of operation are provided. The combustor includes a combustion liner that defines a combustion chamber and that extends along an axial centerline from a forward end to an aft end. The combustor further includes a center fuel nozzle that extends along the axial centerline at least partially within the combustion chamber. The combustor further includes a plurality of outer fuel nozzles that surround the center fuel nozzle. The plurality of outer fuel nozzles terminates at the forward end. A venturi injector is positioned in the combustor within the combustion chamber downstream of the center fuel nozzle. The combustor further includes an injector that is coupled to the combustion liner and downstream of the venturi injector.

18 Claims, 7 Drawing Sheets

(56) References Cited

U.S. PATENT DOCUMENTS

| | | | |
|---|---|---|---|
| 8,789,372 B2 | 7/2014 | Johnson et al. | |
| 9,010,120 B2 | 4/2015 | DiCintio et al. | |
| 9,557,050 B2 | 1/2017 | Vandervort et al. | |
| 11,746,704 B2* | 9/2023 | Asai | F02C 9/40 60/776 |
| 2011/0296839 A1* | 12/2011 | Van Nieuwenhuizen | F23R 3/346 60/737 |
| 2012/0011854 A1* | 1/2012 | Khan | F23R 3/283 60/754 |
| 2013/0025289 A1* | 1/2013 | Citeno | F23R 3/346 60/737 |
| 2015/0337741 A1* | 11/2015 | Gassner | F23R 3/36 60/734 |
| 2017/0175635 A1* | 6/2017 | Hughes | F23R 3/346 |
| 2017/0268784 A1* | 9/2017 | Crawley | F23R 3/34 |
| 2018/0202662 A1* | 7/2018 | Kim | F02C 7/22 |
| 2021/0071870 A1* | 3/2021 | Bulat | F23R 3/286 |

OTHER PUBLICATIONS

International Search Report Corresponding to Application No. PCT/US2024/043038 on Nov. 27, 2024.
International Search Report Corresponding to Application No. PCT/US2024/043039 on Nov. 28, 2024.

\* cited by examiner

FLEX FUEL COMBUSTOR

FIELD

The present disclosure relates generally to a combustor capable of efficient operation on multiple different types of fuels, such as ammonia, hydrogen, and/or natural gas.

BACKGROUND

Turbomachines are utilized in a variety of industries and applications for energy transfer purposes. For example, a gas turbine engine generally includes a compressor section, a combustion section, a turbine section, and an exhaust section. The compressor section progressively increases the pressure of a working fluid entering the gas turbine engine and supplies this compressed working fluid to the combustion section. The compressed working fluid and a fuel (e.g., natural gas for traditional systems) mix within the combustion section and burn in a combustion chamber to generate high pressure and high temperature combustion gases. The combustion gases flow from the combustion section into the turbine section where they expand to produce work. For example, expansion of the combustion gases in the turbine section may rotate a rotor shaft connected, e.g., to a generator to produce electricity. The combustion gases then exit the gas turbine engine via the exhaust section.

Traditional gas turbine engines include one or more combustors that burn a mixture of natural gas and air within the combustion chamber to generate the high pressure and temperature combustion gases. As a byproduct, nitrogen oxides (NOx) and other pollutants are created and expelled by the exhaust section. Regulatory requirements for low emissions from gas turbines are continually growing more stringent, and environmental agencies throughout the world are now requiring even lower rates of emissions of NOx and other pollutants from both new and existing gas turbines.

Alternative fuels can be used as a substitute for natural gas to reduce the production of NOx in the combustor. However, many alternative fuels have burning characteristics that make them unsuitable for use with traditional combustors and combustor operating methods. For example, such characteristics may include flame speed that is too slow/fast, flame temperature that is too hot/cold, and/or unwanted combustion byproducts.

Accordingly, an improved combustor capable of efficient operation on alternative fuels, such as ammonia ($NH_3$) and/or hydrogen is desired and would be appreciated in the art.

BRIEF DESCRIPTION

Aspects and advantages of the combustors and methods in accordance with the present disclosure will be set forth in part in the following description, or may be obvious from the description, or may be learned through practice of the technology.

In accordance with one embodiment, a combustor is provided. The combustor includes a combustion liner that defines a combustion chamber and that extends along an axial centerline from a forward end to an aft end. The combustor further includes a center fuel nozzle that extends along the axial centerline at least partially within the combustion chamber. The combustor further includes a plurality of outer fuel nozzles that surround the center fuel nozzle. The plurality of outer fuel nozzles terminates at the forward end. A venturi injector is positioned within the combustion chamber downstream of the center fuel nozzle. The combustor further includes an injector that is positioned in the combustor downstream of the venturi injector.

In accordance with another embodiment, a method of operating a combustor in a gas turbine engine on one or more fuels from a fuel supply system is provided. The combustor includes a combustion liner that defines a combustion chamber that extends between a forward end and an aft end. The method includes providing, with a plurality of outer fuel nozzles, at least one of air and the one or more fuels to the combustion chamber at the forward end. The method further includes providing, with a center fuel nozzle, at least one of air and the one or more fuels to the combustion chamber downstream of the forward end. The method further includes providing, with a venturi injector, at least one of air and the one or more fuels to the combustion chamber downstream of the center fuel nozzle. The method further includes providing, with an injector, at least one of air and the one or more fuels to the combustion chamber downstream of the venturi injector. At least one of the plurality of outer fuel nozzles or the center fuel nozzle provides fuel.

These and other features, aspects and advantages of the present combustors and methods will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present combustors and methods, including the best mode of making and using the present systems and methods, directed to one of ordinary skill in the art, is set forth in the specification, which makes reference to the appended figures, in which:

FIG. 7A illustrates an ammonia operating mode in accordance with a first implementation of the method shown by FIG. 7;

FIG. 7B illustrates a hydrogen operating mode in accordance with a second implementation of the method shown by FIG. 7;

FIG. 7C illustrates a natural gas operating mode in accordance with a second implementation of the method shown by FIG. 7.

DETAILED DESCRIPTION

Figure 1:
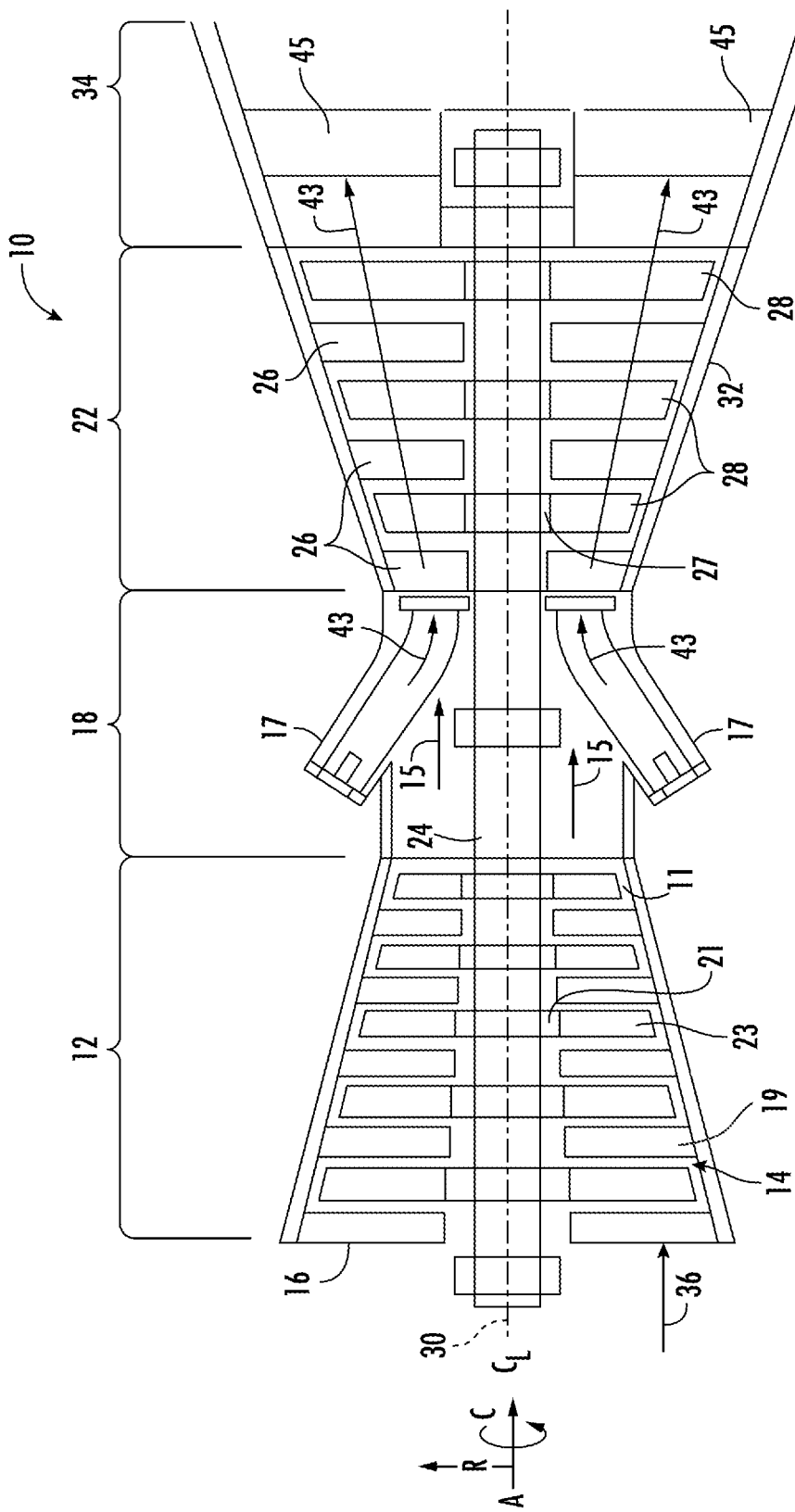
FIG. 1 is a schematic illustration of a turbomachine in accordance with embodiments of the present disclosure.

Reference now will be made in detail to embodiments of the present combustors and methods, one or more examples of which are illustrated in the drawings. Each example is provided by way of explanation, rather than limitation of, the technology. In fact, it will be apparent to those skilled in the art that modifications and variations can be made in the present technology without departing from the scope or spirit of the claimed technology. For instance, features illustrated or described as part of one embodiment can be used with another embodiment to yield a still further embodiment. Thus, it is intended that the present disclosure covers such modifications and variations as come within the scope of the appended claims and their equivalents.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components.

The term "fluid" may refer to a gas or a liquid. The term "fluid communication" means that two or more areas defining a flow passage are joined to one another such that a fluid is capable of making the connection (i.e., flowing) between the areas specified.

As used herein, the terms "upstream" (or "forward") and "downstream" (or "aft") refer to the relative direction with respect to fluid flow in a fluid pathway. For example, "upstream" refers to the direction from which the fluid flows, and "downstream" refers to the direction to which the fluid flows. However, the terms "upstream" and "downstream" as used herein may also refer to a flow of electricity. The term "radially" refers to the relative direction that is substantially perpendicular to an axial centerline of a particular component, the term "axially" refers to the relative direction that is substantially parallel and/or coaxially aligned to an axial centerline of a particular component and the term "circumferentially" refers to the relative direction that extends around the axial centerline of a particular component.

Terms of approximation, such as "about," "approximately," "generally," and "substantially," are not to be limited to the precise value specified. In at least some instances, the approximating language may correspond to the precision of an instrument for measuring the value, or the precision of the methods or machines for constructing or manufacturing the components and/or systems. In at least some instances, the approximating language may correspond to the precision of an instrument for measuring the value, or the precision of the methods or machines for constructing or manufacturing the components and/or systems. For example, the approximating language may refer to being within a 1, 2, 4, 5, 10, 15, or 20 percent margin in either individual values, range(s) of values and/or endpoints defining range(s) of values. When used in the context of an angle or direction, such terms include within ten degrees greater or less than the stated angle or direction. For example, "generally vertical" includes directions within ten degrees of vertical in any direction, e.g., clockwise or counter-clockwise.

The terms "coupled," "fixed," "attached to," and the like refer to both direct coupling, fixing, or attaching, as well as indirect coupling, fixing, or attaching through one or more intermediate components or features, unless otherwise specified herein. The terms "directly coupled," "directly fixed," "directly attached to," and the like mean that two components are joined in contact with one another and that no intermediate components or features are present.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Here and throughout the specification and claims, where range limitations are combined and interchanged, such ranges are identified and include all the sub-ranges contained therein unless context or language indicates otherwise. For example, all ranges disclosed herein are inclusive of the endpoints, and the endpoints are independently combinable with each other.

As used herein, the term "line" may refer to a pipe, hose, tube, or other fluid carrying conduit.

Referring now to the drawings, FIG. 1 illustrates a schematic diagram of one embodiment of a turbomachine, which in the illustrated embodiment is a gas turbine engine 10. Although an industrial or land-based gas turbine engine is shown and described herein, the present disclosure is not limited to an industrial or land-based gas turbine engine, unless otherwise specified in the claims. For example, the invention as described herein may be used in any type of turbomachine including, but not limited to, a steam turbine, an aircraft gas turbine, or a marine gas turbine.

As shown in FIG. 1, the gas turbine engine 10 generally includes a compressor section 12. The compressor section 12 includes a compressor 14. The compressor 14 includes an inlet 16 that is disposed at an upstream end of the gas turbine engine 10. The gas turbine engine 10 further includes a combustion section 18 having one or more combustors 17 disposed downstream from the compressor section 12. The gas turbine engine 10 further includes a turbine section 22 (i.e., an expansion turbine) that is downstream from the combustion section 18. A shaft 24 extends generally axially through the gas turbine 10.

The compressor section 12 may generally include a plurality of rotor disks 21 and a plurality of rotor blades 23 extending radially outwardly from and connected to each rotor disk 21. Each rotor disk 21 in turn may be coupled to or form a portion of the shaft 24 that extends through the compressor section 12. The rotor blades 23 of the compressor section 12 may include turbomachine airfoils that define an airfoil shape (e.g., having a leading edge, a trailing edge, and side walls extending between the leading edge and the trailing edge). Additionally, in many embodiments, the compressor section 12 may include stator vanes 19 disposed between the rotor blades 23 to define various compressor stages. The stator vanes 19 may extend from, and couple to, a compressor casing 11.

The turbine section 22 may generally include a plurality of rotor disks 27 and a plurality of rotor blades 28 extending radially outwardly from and being interconnected to each rotor disk 27. Each rotor disk 27 in turn may be coupled to or form a portion of the shaft 24 that extends through the turbine section 22. The turbine section 22 further includes an outer casing 32 that circumferentially surrounds the portion of the shaft 24 and the rotor blades 28. The turbine section 22 may include stator vanes 26 extending radially inward from the outer casing 32. The rotor blades 28 and stator vanes 26 may be arranged in alternating fashion to define expansion stages along an axial centerline 30 of gas turbine engine 10. Both the rotor blades 28 and the stator vanes 26 may include turbomachine airfoils that define an airfoil shape (e.g., having a leading edge, a trailing edge, and side walls extending between the leading edge and the trailing edge).

In operation, ambient air 36 or other working fluid is drawn into the inlet 16 of the compressor 14 and is progressively compressed to provide a compressed air 15 to the combustion section 18. The compressed air 15 flows into the combustion section 18 and is mixed with fuel to form a combustible mixture. The combustible mixture is burned within a combustion chamber of the combustor 20, thereby generating combustion gases 43 that flow from the combustion chamber into the turbine section 22. Energy (kinetic and/or thermal) is transferred from the combustion gases 43 to the rotor blades 28, causing the shaft 24 to rotate and produce mechanical work. The spent combustion gases 43 (also called "exhaust gases") exit the turbine section 22 and flow through the exhaust diffuser 34 across a plurality of struts or main airfoils 45 that are disposed within the exhaust diffuser 34.

The gas turbine engine 10 may define a cylindrical coordinate system having an axial direction A extending along the axial centerline 30, a radial direction R perpendicular to the axial centerline 30, and a circumferential direction C extending around the axial centerline 30.

Figure 2:
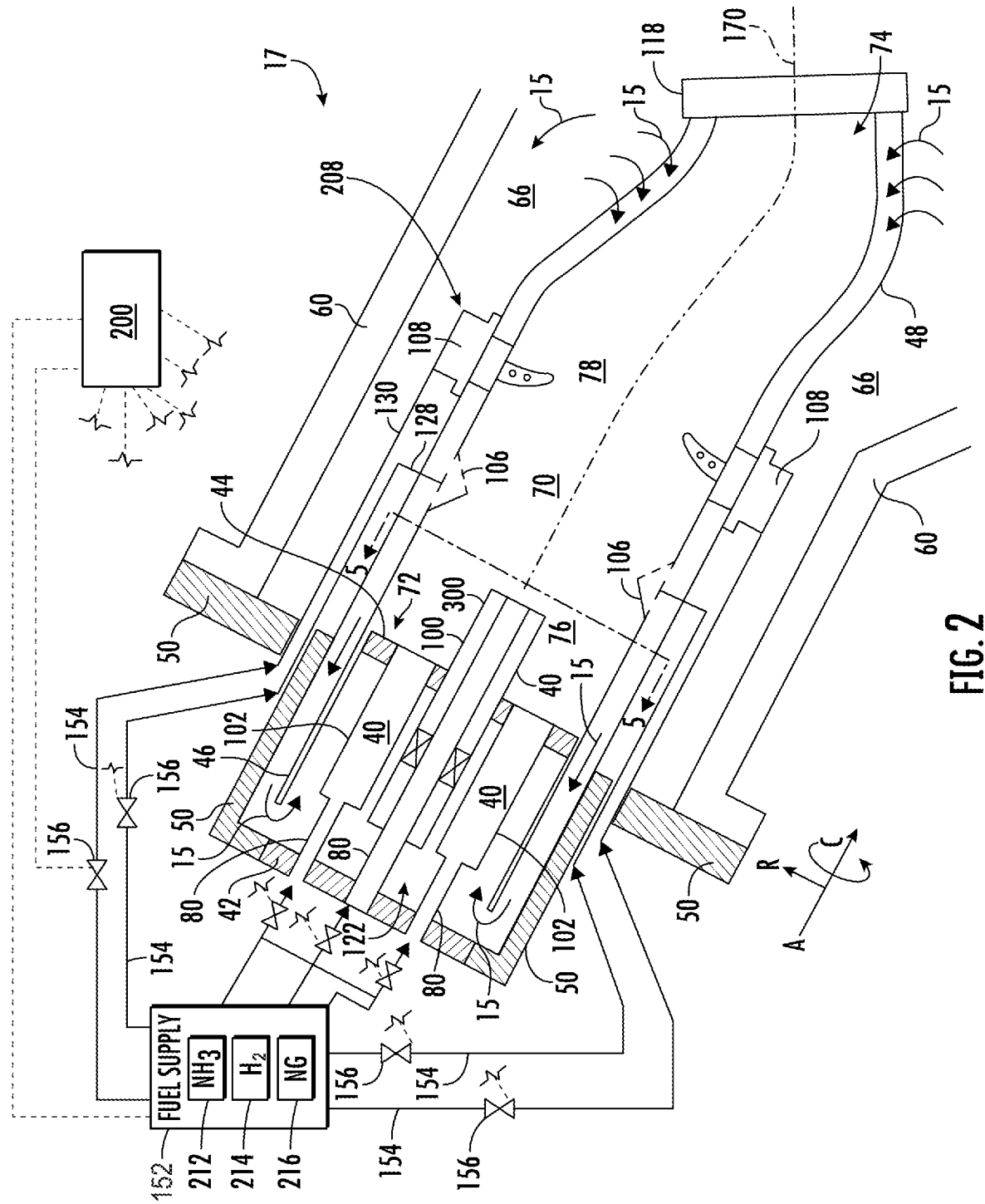
FIG. 2 illustrates a combustor in accordance with embodiments of the present disclosure.

FIG. 2 is a schematic representation of a combustor 17, as may be included in a can annular combustion system for the gas turbine engine 10. In a can annular combustion system, a plurality of combustors 17 (e.g., 8, 10, 12, 14, 16, or more) are positioned in an annular array about the shaft 24 that connects the compressor section 12 to the turbine section 22.

As shown in FIG. 2, the combustor 17 may define a cylindrical coordinate system having an axial direction A that extends along an axial centerline 170. The combustor may also define a circumferential direction C which extends around the axial direction A and the axial centerline 170. The combustor 17 may further define a radial direction R perpendicular to the axial direction A and the axial centerline 170.

As shown in FIG. 2. the combustor 17 includes a combustion liner 46 that defines a combustion chamber 70 extending between a forward end 72 and an aft end 74. The combustion liner 46 may be positioned within (i.e., circumferentially surrounded by) an outer sleeve 48, such that an annulus 47 is formed therebetween. That is, the outer sleeve 48 may be spaced radially outward of the combustion liner 46 to define the annulus 47 through which compressed air 15 flows to a head end of the combustor 17. For example, compressed air 15 may enter the annulus 47 through the outer sleeve 48 (e.g., through apertures proximate an aft frame 118) and travel towards an end cover 42, such that the compressed air 15 within the annulus 47 flows opposite the direction of combustion gases within the combustion liner 46. Heat is transferred convectively from the combustion liner 46 to the compressed air 15, thus cooling the combustion liner 46 and warming the compressed air 15.

In some embodiments, the outer sleeve 48 may include a flow sleeve and an impingement sleeve coupled to one another. The flow sleeve may be disposed at the forward end, and the impingement sleeve may be disposed at the aft end. Alternately, the outer sleeve 48 may have a unified body (or "unisleeve") construction, in which the flow sleeve and the impingement sleeve are integrated with one another in the axial direction. As before, any discussion of the outer sleeve 48 herein is intended to encompass both conventional combustion systems having a separate flow sleeve and impingement sleeve and combustion systems having a unisleeve outer sleeve.

The combustion liner 46 may contain and convey combustion gases to the turbine section 22. The combustion liner 46 defines the combustion chamber 70 within which combustion occurs. As shown in FIG. 2, the combustion liner 46 may extend between fuel nozzles 40 and the aft frame 118. The combustion liner 46 may have a cylindrical liner portion and a tapered transition portion that is separate from the cylindrical liner portion, as in many conventional combustion systems. Alternately, the combustion liner 46 may have a unified body (or "unibody") construction, in which the cylindrical portion and the tapered portion are integrated with one another. Thus, any discussion of the combustion liner 46 herein is intended to encompass both conventional combustion systems having a separate liner and transition piece and those combustion systems having a unibody liner. Moreover, the present disclosure is equally applicable to those combustion systems in which the transition piece and the stage one nozzle of the turbine section 22 are integrated into a single unit, sometimes referred to as a "transition nozzle" or an "integrated exit piece."

A forward casing 50 and the end cover 42 of the combustor 17 define the head end air plenum 122, which includes the one or more fuel nozzles 40. Particularly, the one or more fuel nozzles 40 may include a center fuel nozzle 100 extending along the axial centerline 170 of the combustor 17 and a plurality of outer fuel nozzles 102 surrounding the center fuel nozzle 100. The forward casing 50 may be fluidly and mechanically connected to a compressor discharge casing 60, which defines a high pressure plenum 66 around the combustion liner 46 and the outer sleeve 48. The fuel nozzles 40 may be positioned within the head end air plenum 122 defined at least partially by the forward casing 50. In many embodiments, the fuel nozzles 40 may extend from the end cover 42. For example, each fuel nozzle 40 may be coupled to an aft surface of the end cover 42 via a flange (not shown). As shown in FIG. 2, the at least one fuel nozzle 40 may be partially surrounded by the combustion liner 46.

The aft, or downstream ends, of the fuel nozzles 40 extend through a cap plate 44 that defines the upstream end of the combustion chamber 70 (and a downstream end of the head end air plenum 122). Particularly, the outer fuel nozzles 102 may terminate at an aft or downstream surface of the cap plate 44, and the center fuel nozzle 100 may extend axially beyond (or downstream) of the cap plate 44 into the combustion chamber 70. In other words, the outer fuel nozzles 102 may terminate at a downstream surface of the cap plate 44, such that the outer fuel nozzles extend through the cap plate 44 (but not into the combustion chamber 70) and inject fuel/air at the downstream surface of the cap plate 44 into the combustion chamber 70.

As discussed below, the outer fuel nozzles 102 may be any type of fuel nozzle, such as bundled tube fuel nozzles or swirler nozzles (often referred to as "swozzles"). In exemplary embodiments, the center fuel nozzle 100 may be an enlarged swirler nozzle (e.g., having a larger outermost diameter and longer axial length than the outer fuel nozzles 102) that extends axially beyond the cap plate 44 and into the combustion chamber 70.

The fuel nozzles 40 may be positioned at the forward end of the combustor 17, and fuel may be directed through fuel supply conduits 80, which may extend through an end cover 42, and into the fuel nozzles 40. The fuel nozzles 40 convey the fuel and compressed air 15 into the combustion chamber 70, where combustion occurs. In some embodiments, the fuel and compressed air 15 are combined as a mixture prior to reaching the combustion chamber 70.

As mentioned above, the combustion liner 46 may define a combustion chamber 70 that extends along an axial centerline from a forward end 72 to an aft end 74. The downstream surface of the cap plate 44, the outlets of the outer fuel nozzles 102, and the combustion liner 46 may collectively define the forward end 72 of the combustion chamber 70, and the aft end 74 of the combustion chamber 70 may be disposed at the aft frame 118.

The center fuel nozzle 100 may extend along the axial centerline 170 of the combustor 17 at least partially within the combustion chamber 70. That is, the center fuel nozzle 100 may inject one of air, fuel, or air and fuel into the combustion chamber 70 downstream of the plurality of outer fuel nozzles 102. The plurality of outer fuel nozzles 102 may collectively surround the center fuel nozzle and may terminate at the forward end 72.

In exemplary embodiments, as will be discussed below in more detail, the combustor 17 may further include a venturi injector positioned within the combustion chamber 70 downstream of the center fuel nozzle. venturi injector 106 coupled to or integrated with the combustion liner 46. The venturi injector 106 may be disposed within the combustion chamber 70 downstream of the center fuel nozzle 100 (and the plurality of outer fuel nozzles 102). Additionally, the combustor 17 may include an injector 108 positioned within the combustor 17. The injector 108 may be positioned within the combustion chamber 70 downstream of the venturi injector 106.

The fuel nozzles 40, the venturi injector 106, and the injector 108 may each be in fluid communication with a fuel supply system 152, which is configured to supply two or more fuels. In many embodiments, the center fuel nozzle 100, the plurality of outer fuel nozzles 102, the venturi injector 106, and the injector 108 may each be fluidly coupled (e.g., separately fluidly coupled) to the fuel supply system 152 (e.g., via one or more fuel supply lines 154).

The fuel supply system 152 may selectively supply fuel to the center fuel nozzle 100, the outer fuel nozzles 102, the venturi injector 106, and the injector 108. That is, the fuel supply system 152 may be configured to selectively supply different fuel types, amounts, mixtures, etc. to each of the center fuel nozzle 100, the outer fuel nozzles 102, the venturi injector 106, and the injector 108. In many embodiments, the fuel supply system 152 may include an ammonia supply 212 (such as a liquid ammonia supply and/or gaseous ammonia supply), a hydrogen supply 214 (such as a liquid hydrogen supply and/or gaseous hydrogen supply), and/or a natural gas supply 216 (such as a methane supply or other natural gas).

In some implementations, the fuel supply system 152 may provide a different type of fuel to each of the center fuel nozzle 100, the outer fuel nozzles 102. the venturi injector 106, and the injector 108 during operation of the combustor 17. In some implementations, the fuel supply system may provide only one type of fuel to one or more of the center fuel nozzle 100, the outer fuel nozzles 102, the venturi injector 106, and the injector 108 at a time, such as solely ammonia, solely hydrogen, and/or solely natural gas. In other implementations, the fuel supply system 152 may provide a fuel mixture of any combination of ammonia, hydrogen, and/or natural gas to one or more of the center fuel nozzle 100, the outer fuel nozzles 102, the venturi injector 106, and the injector 108.

In many embodiments, one or more fuel supply lines 154 may fluidly couple each of the center fuel nozzle 100, the outer fuel nozzles 102, the venturi injector 106, and the injector 108 to the fuel supply system 152. One or more valves 156 may be disposed on, and in fluid communication with, the fuel supply lines 154. The valves 156 may be independently actuatable between an open position and a closed position. In the open position, fuel may be permitted to flow through the fuel supply line 154 to which the valve 156 is attached. In the closed position, fuel may be restricted or otherwise prevented from flowing through the fuel supply line 154 to which the valve 156 is attached.

In various embodiments, as shown in FIG. 2, a first fuel supply line 154 may extend between the fuel supply system 152 and the center fuel nozzle 100, and a first valve 156 may be disposed on, and in fluid communication with, the first fuel supply line 154. A second fuel supply line 154 may extend between the fuel supply system 152 and the outer fuel nozzle(s) 102, and a second valve 156 may be disposed on, and in fluid communication with, the second fuel supply line 154. A third fuel supply line 154 may extend between the fuel supply system 152 and the venturi injector 106, and a third valve 156 may be disposed on, and in fluid communication with, the third fuel supply line 154. A fourth fuel supply line 154 may extend between the fuel supply system 152 and the injector 108, and a fourth valve 156 may be disposed on, and in fluid communication with, the fourth fuel supply line 154. In this way, each of the center fuel nozzle 100, the outer fuel nozzles 102, the venturi injector 106, and the injector 108 may be separately fluidly coupled to the fuel supply system 152. As such, each center fuel nozzle 100, the outer fuel nozzles 102, the venturi injector 106, and the injector 108 may be selectively provided with a fuel or fuels from the fuel supply system.

In many embodiments, a controller 200 may be operably connected to, and in communication with, the fuel supply system 152 and each of the valves 156. The controller 200 may be configured to send control signals to the fuel supply system 152 and/or the valves 156 to adjust their operation. For example, the controller 200 may selectively adjust the amount of fuel, fuel type, fuel mixture, etc. provided by the fuel supply system 152 to the fuel nozzles 40. Additionally, the controller 200 may selectively actuate or modulate the valves between the open position and the closed position to adjust which of the fuel nozzles 40 and/or injectors 106, 108 receives fuel.

Figure 3:
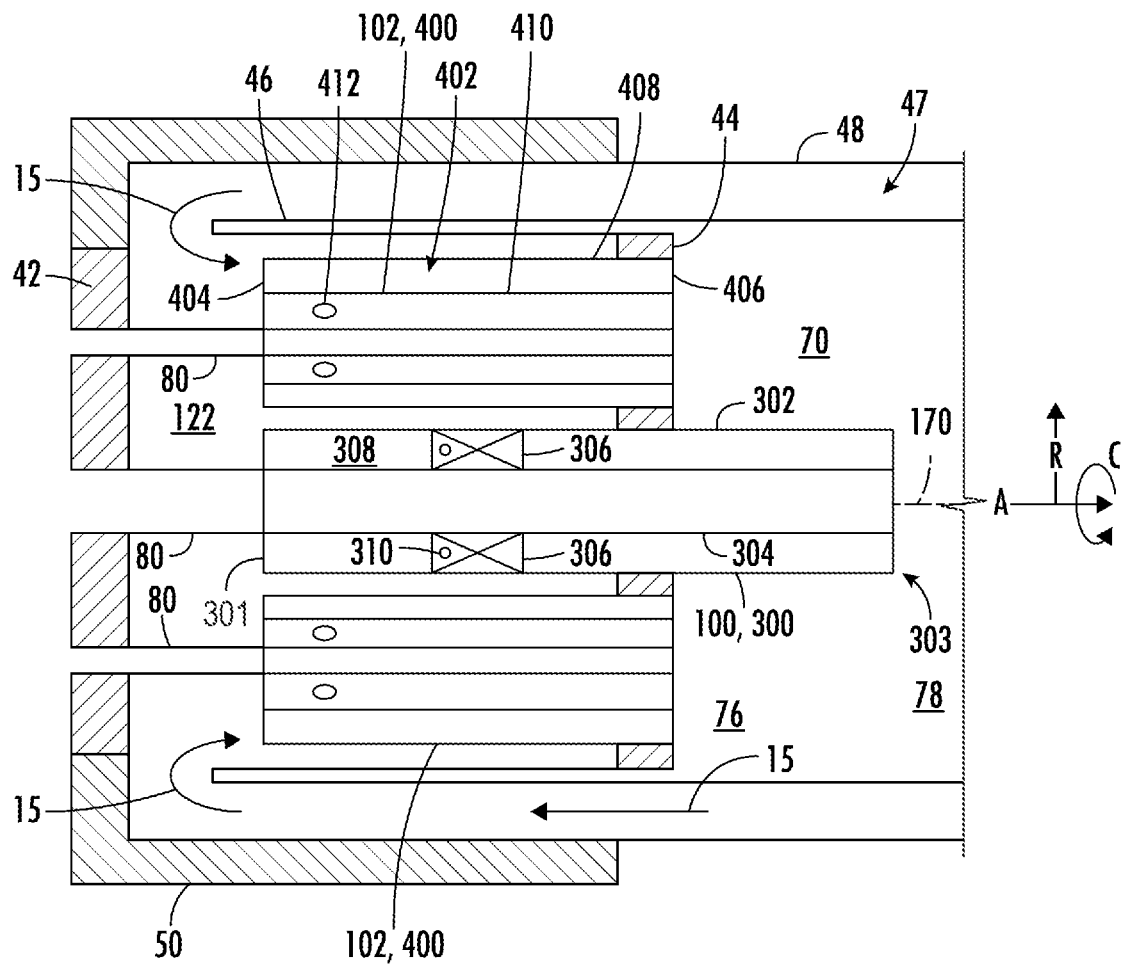
FIG. 3 illustrates an enlarged view of a forward portion of the combustor shown in FIG. 2 in accordance with embodiments of the present disclosure.

Referring now to FIG. 3, an enlarged view of a forward portion of the combustor 17 shown in FIG. 2 is illustrated in accordance with various aspects of the present disclosure. As shown in FIG. 3, in exemplary embodiments, the center fuel nozzle 100 may be a swirler nozzle 300 (or "swozzle") having an outer tube 302, a center body 304, and vanes 306 extending between the center body 304 and the outer tube 302. The swirler nozzle 300 may extend from a first end 301 disposed in the head end air plenum 122 to a second end 303 disposed in the combustion chamber 70. The swirler nozzle 300 may include a first portion disposed in the head end air plenum 122 and a second portion disposed in the combustion chamber 70.

The outer tube 302 and the center body 304 may extend axially between the first end 301 and the second end 303. The center body 304 may be radially spaced apart from the outer tube 302, such that an annulus 308 is defined between the outer tube 302 and the center body 304. The vanes 306 may extend between the center body 304 and the outer tube 302, and the vanes 306 may be disposed in the annulus 308. In many embodiments, the center body 304 may receive fuel (e.g., via the fuel conduit 80, which fluidly couples to the center body 304). The annulus 308 may receive air from the head end air plenum 122. The vanes 306 may be hollow and in fluid communication with both the center body 304 and the annulus 308, such that the vanes 306 inject fuel into the annulus 308 as air flows over the vanes 306. For example, the vanes 306 may define a fuel port 310 that provides fuel to the annulus 308. The air/fuel may mix together within the annulus 308 downstream of the vanes 306, and the resulting air/fuel mixture may be injected into the combustion chamber 70 at the second end 303. The vanes 306 may be contoured or curved and may define an airfoil shape in many embodiments, such that the vanes 306 induce a swirl to the flow of fuel and air within the annulus 308.

Figure 5:
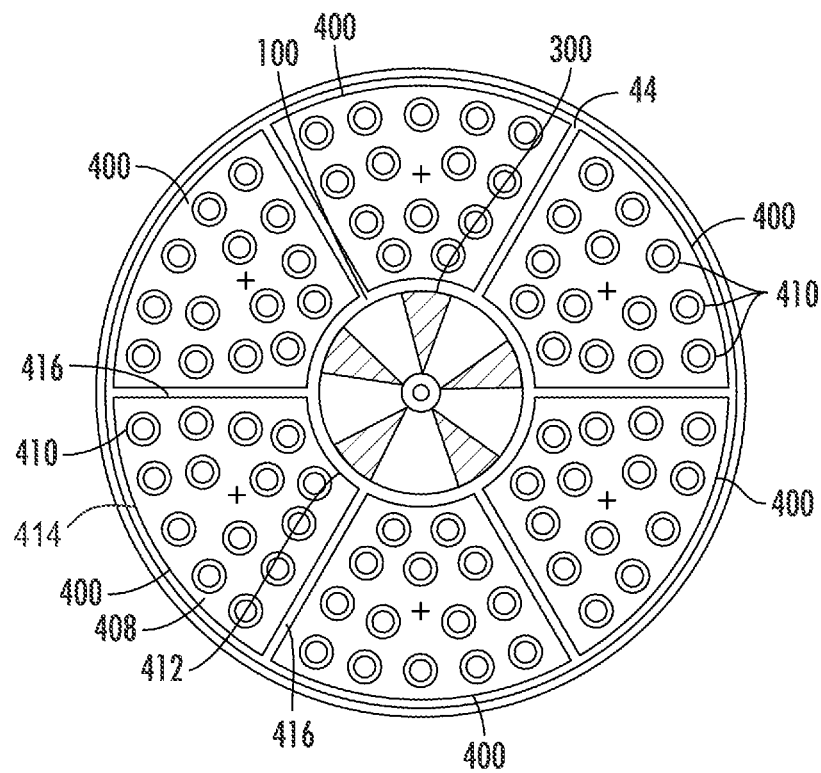
FIG. 5 illustrates a cross-sectional view of the combustor shown in FIG. 2 from along the line 5-5 of FIG. 2 in accordance with embodiments of the present disclosure.
Figure 6:
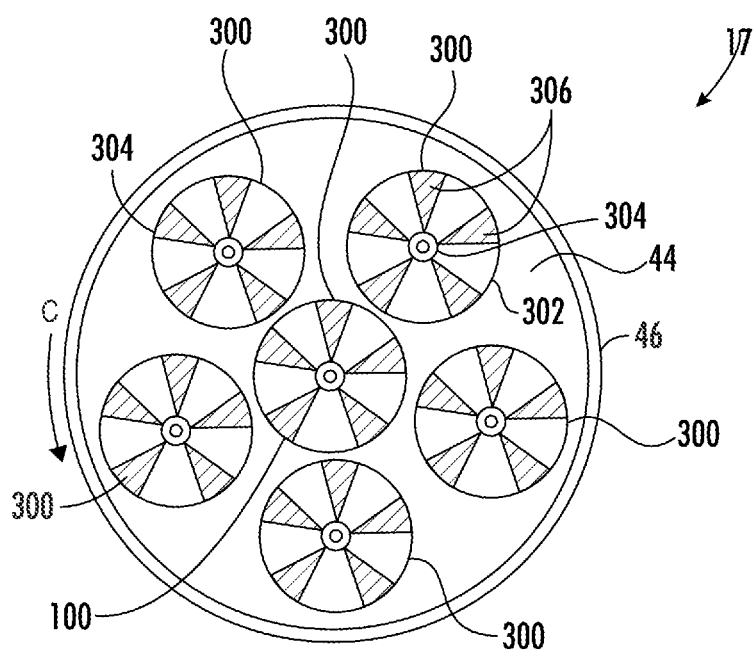
FIG. 6 illustrates a cross-sectional view of a combustor in accordance with embodiments of the present disclosure.

The outer fuel nozzles 102 may be disposed radially outwardly of the swirler nozzle 300. In many embodiments, as shown in FIGS. 5 and 6, the outer fuel nozzles 102 may circumferentially surround the swirler nozzle 300. Additionally, the outer tube 302 of the swirler nozzle 300 may partially define the combustion chamber 70, such that the fuel/air from the outer fuel nozzles 102 travels along the outer tube 302, which advantageously creates a flow recirculation zone aft of the swirler nozzle 300 that promotes mixing and efficient combustion. In this way, the combustion chamber 70 may include an annular (e.g., toroidal) portion 76 defined between the combustion liner 46 and the outer tube 302. Particularly, the annular portion 76 may be defined radially between the combustion liner 46 and the outer tube 302, and the annular portion 76 may be defined axially between the outlets of the outer fuel nozzles 102 (or downstream surface of the cap plate 44) and the second end 303 of the swirler nozzle 300. The air (or fuel and air) traveling through the annulus 308 may advantageously be preheated by the combustion gases traveling through the combustion chamber 70 along the outer surface of the outer tube 302. The combustion chamber 70 may further include a main portion 78 extending aft of the annular portion 76 to the aft end 74. Particularly, the main portion 78 may be defined entirely by the combustion liner 46 and may extend axially between the second end 303 of the swirler nozzle 300 and the aft end 74 of the combustion chamber 70.

In addition to air/fuel injection, the outer tube 302 of the swirler nozzle 300 may provide for bluff body stabilization within the combustion chamber 70. Bluff body stabilization occurs when the mixture of fuel/air exiting the outer fuel nozzles 102 combusts and passes around the outer tube 302 of the swirler nozzle. The combustion gases and un-combusted fuel/air creates a wake or recirculation zone aft the swirler nozzle 300, which increases mixing to thereby facilitate the formation of a stable flame.

In some embodiments, the outer fuel nozzles 102 may each be a bundled tube fuel nozzle 400. The bundled tube fuel nozzle 400 may define a fuel plenum 402 with (e.g., collectively with) a forward plate 404, an aft plate 406, and an annular body 408 that extends (e.g., axially) between the forward plate 404 and the aft plate 406. The fuel plenum 402 may receive fuel from the fuel supply conduit 80, which is fluidly coupled thereto. A plurality of tubes 410 may extend through the fuel plenum 402 from the forward plate 404 to the aft plate 406. The plurality of tubes 410 may each define an inlet (e.g., for air) at the forward plate 404, an outlet (e.g., for air/fuel) at the aft plate 406, and a passage extending between the inlet and the outlet. The inlet of each tube 410 may be fluidly coupled to the head end air plenum 122, and the outlet of each tube 410 may be fluidly coupled to the combustion chamber 70. Each of the tubes 410 may define a fuel port 412 between the inlet and the outlet that fluidly couples the passage of the tube 410 to the fuel plenum 402.

Figure 4:
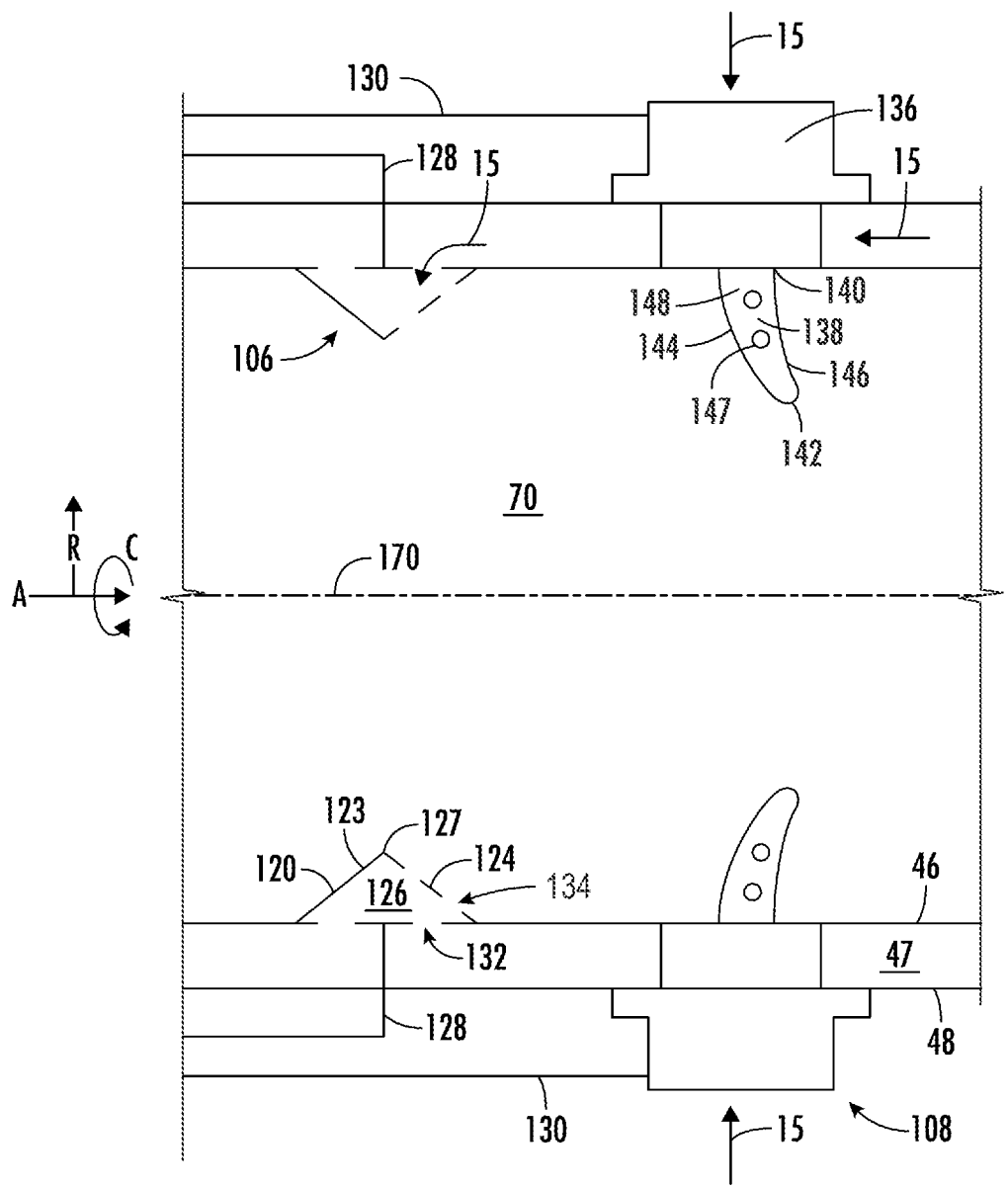
FIG. 4 illustrates an enlarged view of a middle portion of the combustor shown in FIG. 2 in accordance with embodiments of the present disclosure.

Referring now to FIG. 4, an enlarged view of a middle portion of the combustor 17 shown in FIG. 2 is illustrated in accordance with various aspects of the present disclosure. The venturi injector 106 is an injector for injecting a fluid into the flow path of the combustion chamber 70 which causes a reduction in the cross section of the flow path followed by an increase of the cross section. The reduction in cross section leads to a local reduction in static pressure. The venturi injector 106 causes a vortex in the flow path downstream of the smallest cross section. The fluid is injected into the vortex. The vortex extends around the circumference of the whole combustion chamber 70 and allows a fast mixing of the injected fluid with the gas in the combustion chamber's flow path. The venturi injector 106 is capable of introducing air (or an oxygen containing fluid) to change the mixture of fuel/oxidizer within the combustion chamber 70 from rich to lean in a short axial distance. In addition, fuel may be introduced with the venturi injector 106 into the combustion chamber 70.

Particularly, as shown in FIG. 4, the venturi injector 106 may include a venturi nozzle body 120 having a first slanted wall 123, a second slanted wall 124, and an apex 127 at an intersection between the first slanted wall 123 and the second slanted wall 124. The venturi nozzle body 120 may be generally hollow and have a hollow interior 126 (or an interior that defines one or more fuel/air passages). The first slanted wall 123 and the second slanted wall 124 may be oblique, slanted, or otherwise angled with respect to the radial direction R and the axial direction A of the combustor 17 in the axial-radial plane (e.g., the plane shown by FIG. 4). The apex 127 may be the radially inwardmost point of the venturi nozzle body 120 (e.g., the point closest to the axial centerline 170). The second slanted wall 124 may be disposed downstream from the first slanted wall 123 with respect to the flow of combustion gases in the combustion chamber 70. In many embodiments, the venturi nozzle body 120 may extend annularly about the axial centerline 170. In some embodiments, the venturi injector may have a generally triangular cross-sectional shape (in the axial-radial plane).

In exemplary embodiments, the first slanted wall 123 may extend towards the axial centerline 170 of the combustor 17 as the first slanted wall 123 extends from the combustion liner 46 to the apex 127. In other words, the first slanted wall 123 may diverge radially outwardly as the first slanted wall 123 extends axially from the combustion liner 46 to the apex 127. The first slanted wall 123 may face towards a forward end of the combustor 17 (e.g., towards the fuel nozzles 40), and the second slanted wall 124 may face towards an aft end of the combustor 17 (e.g., towards the aft frame 118). The second slanted wall 124 may extend away from the axial centerline 170 of the combustor 17 as the second slanted wall 124 extends from the apex 127 to the combustion liner 46. In other words, the second slanted wall 123 may converge radially inwardly as the second slanted wall 123 extends axially from the apex 127 to the combustion liner 46.

Referring back to FIG. 2, briefly, the venturi injector 106 may be fluidly coupled to a fluid supply conduit 128. The fluid supply conduit 128 may extend through the forward casing 50, the high pressure plenum 66, the outer sleeve 48, the annulus 47, and the combustion liner 46 to fluidly couple the venturi injector 106 to the fuel supply line 154, thereby coupling the venturi injector 106 to the fuel supply system 152. Similarly, the injector 108 may be fluidly coupled to a fluid supply conduit 130. The fluid supply conduit 130 may extend through the forward casing 50 and the high pressure plenum 66 to fluidly couple the injector 108 to the fuel supply line 154, thereby coupling the injector 108 to the fuel supply system 152.

As shown in FIG. 4, the venturi body 120 (e.g., the interior 126) may receive fuel from the fluid supply conduit 128, and the venturi body 120 (e.g., the interior 126) may receive air from the annulus 47. Particularly, one or more air inlets 132 may be defined through the venturi body 120 and/or the combustion liner 46 to fluidly couple the interior 126 to the annulus 47. In many embodiments, the venturi injector 106 may include outlets 134 defined in the second slanted wall 124 of the venturi nozzle body 120. The outlet 134 may provide for fluid communication between the interior 126 of the venturi injector 106 and the combustion chamber 70.

In various embodiments, the injector 108 may extend radially into the combustion chamber 70. For example, the injector 108 may include a main body 136 and an airfoil-shaped injection body 138. The main body 136 may be coupled to the outer sleeve 48 and may extend through the outer sleeve 48 and the combustion liner 46. The main body 136 may define a passage or passages that receive compressed air 15 from the high pressure plenum 66. In one embodiment, a boss (not shown) supporting the injector 108 functions as a fastener for securing the outer sleeve 48 to the combustion liner 46. In other embodiments, the injector 108 may be coupled to the outer sleeve 48 in any suitable manner, and the outer sleeve 48 may have any suitable number of components coupled between the flange of the forward casing 50 and the turbine nozzle in any suitable manner that permits the injector 108 to function as described herein.

As shown in FIG. 4, the injector 108 may include an airfoil-shaped injection body 138 that extends into the combustion chamber 70. In some embodiments, the airfoil-shaped injection body 138 may extend radially beyond the venturi injector 106. The injection body 138 may extend from a base 140 coupled to the main body 136 to a tip 142. Additionally, the airfoil-shaped injection body 138 may include a leading edge 144, a trailing edge 146, and a side surface 148 extending between the leading edge 144 and the trailing edge 146. One or more injection ports 147 may defined on the side surface 148 of the airfoil-shaped injection body 138. The one or more injection ports 147 may provide fuel, air, or a mixture of fuel and air to the combustion chamber 70.

Referring now to FIG. 5, a cross-sectional view of the combustor 17 shown in FIG. 2 from along the line 5-5 is illustrated in accordance with embodiments of the present disclosure. As shown, the combustor 17 may include a plurality of bundled tube fuel nozzles 400 that are positioned about, and that collectively surround, the center fuel nozzle 100 (which may be configured as a swirler nozzle 300). As discussed above, each of the bundled tube fuel nozzles 400 may include a plurality of tubes 410. Each of the bundled tube fuel nozzles 400, and the center fuel nozzle 100, may extend through a cap plate 44 that defines the forward end 72 of the combustion chamber 70. The bundled tube fuel nozzles 400 may be wedge shaped, such that the body 408 includes a first arcuate end wall 412, a second arcuate end wall 414, and two straight end walls 416 extending between the first arcuate end wall 412 and the second arcuate end wall 414. In other embodiments (not shown), the bundled tube fuel nozzles 400 may be circularly shaped (such that the body 408 is annular).

Referring now to FIG. 6, a cross-sectional view of the combustor 17 is illustrated in accordance with embodiments of the present disclosure. As shown, the combustor 17 may include a plurality of swirler nozzles 300 that are positioned about, and that collectively surround, the center fuel nozzle 100 (which may also be configured as a swirler nozzle 300). As discussed above, each of the swirler nozzles 300 may include an outer tube 302, a center body 304, and a plurality of vanes 306 extending between the outer tube 302 and the center body 304.

Figure 7:
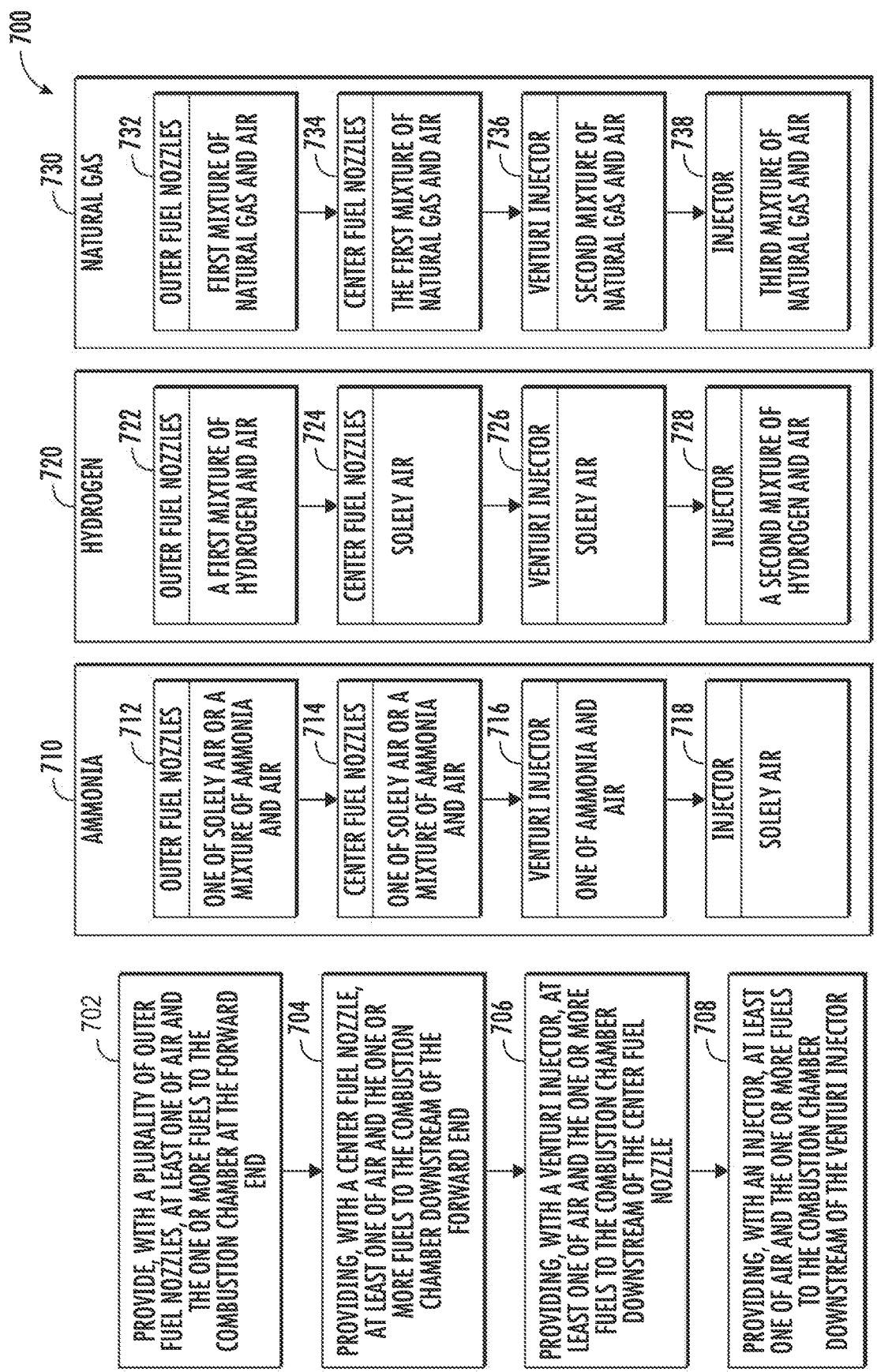
FIG. 7 illustrates a flow chart of a method of operating a combustor in a gas turbine on one or more fuels from a fuel supply system in accordance with embodiments of the present disclosure.

Referring now to FIG. 7, a flow diagram of one embodiment of a method 700 of operating a combustor 17 in a gas turbine engine 10 on one or more fuels from a fuel supply system 152 is illustrated in accordance with embodiments of the present subject matter. In general, the method 700 will be described herein with reference to the combustor 17 described above with reference to FIGS. 1-6. However, it will be appreciated by those of ordinary skill in the art that the disclosed method 700 may generally be utilized with any suitable combustor and/or may be utilized in connection with a system having any other suitable system configuration. In addition, although FIG. 7 depicts steps performed in a particular order for purposes of illustration and discussion, the methods discussed herein are not limited to any particular order or arrangement unless otherwise specified in the claims. One skilled in the art, using the disclosures provided herein, will appreciate that various steps of the methods disclosed herein can be omitted, rearranged, combined, and/or adapted in various ways without deviating from the scope of the present disclosure.

As shown in FIG. 7, the method 700 may encompass an ammonia operating mode 710, a hydrogen operating mode 720, and a natural gas operating mode 730. In general, the method 700 may include, at step 702, providing, with a plurality of outer fuel nozzles, at least one of air and the one or more fuels to the combustion chamber at the forward end. That is, the outer fuel nozzles may provide (or inject) only air, only fuel, or a mixture of air and fuel to the combustion chamber. In exemplary implementations, the method 700 may include, at step 704, providing, with a center fuel nozzle, at least one of air and the one or more fuels to the combustion chamber downstream of the forward end. For example, the center fuel nozzle may provide (or inject) only air, only fuel, or a mixture of air and fuel to the combustion chamber downstream of the outer fuel nozzles.

In various implementations, the method 700 may include, at step 706, providing, with a venturi injector, at least one of air and the one or more fuels to the combustion chamber downstream of the center fuel nozzle. That is, the venturi injector may provide (or inject) only air, only fuel, or a mixture of air and fuel to the combustion chamber downstream of the center fuel nozzle. Finally, the method 700 may include, at step 708, providing, with an injector, at least one of air and the one or more fuels to the combustion chamber downstream of the venturi injector. For example, the injector may provide (or inject) only air, only fuel, or a mixture of air and fuel to the combustion chamber downstream of the venturi injector. In exemplary implementations, at least one of the plurality of outer fuel nozzles or the center fuel nozzle provides fuel. That is, fuel may be provided by at least one of the plurality of outer fuel nozzles or the center fuel nozzle, and the various other injectors may provide air, fuel, or air and fuel.

In the ammonia operating mode 710, as shown in FIG. 7A, the one or more fuels is an ammonia rich fuel. The ammonia rich fuel may contain a majority of ammonia, such as at least 50% ammonia, or at least 60%, or at least 70% or at least 80%, or at least 90%. In some embodiments, the one or more fuels may be entirely ammonia (e.g., 100% ammonia, such that no other fuel is provided to the combustion chamber). In such operating modes, the method 700 may include, at step 712, providing, with the plurality of outer fuel nozzles, one of solely air or a second mixture of ammonia and air. That is, the plurality of outer fuel nozzles may provide only air (e.g., not mixed with fuel) or a second mixture of ammonia and air. The second mixture may be the same or different than the first mixture (e.g., the composition of air/fuel may be the same or different). Additionally, or subsequently, the method 700 may include, at step 714, providing, with the center fuel nozzle, one of the ammonia rich fuel or a first mixture of ammonia and air to the combustion chamber. That is, the center fuel nozzle may provide only ammonia (e.g., not mixed with air) or a first mixture of ammonia and air.

Further, the method 700 may include, at step 716, providing, with the venturi injector, at least one of ammonia and air to the combustion chamber. Particularly, the venturi injector may provide or inject at least one of ammonia and air such that an equivalence ratio is between about 1.1 and 1.5 upstream of the injector. That is, the venturi injector may inject solely air (not mixed with ammonia), the ammonia rich fuel (not mixed with air), or air mixed with ammonia such that an equivalence ratio is between about 1.1 and 1.5 upstream of the injector. As used herein, the equivalence ratio ($\Phi$) is defined as the ratio of the fuel-to-air ratio (or actual ratio) and the stoichiometric fuel-to-air ratio (or theoretical ratio). Mathematically, the equivalence ratio may be calculated as follows:

$$\Phi = \frac{m_{fuel}/m_{air}}{(m_{fuel}/m_{air})_{st}}$$

where m represents the mass, and the suffix st stands for stoichiometric conditions.

As used herein, "rich mixture" may refer to a fuel/air or fuel/oxidant mixture having an equivalence ratio ($\Phi$) greater than 1, and "lean mixture" may refer to a fuel/air mixture having an equivalence ratio ($\Phi$) less than 1. In this way, the venturi injector may inject solely air (not mixed with ammonia), the ammonia rich fuel (not mixed with air), or air mixed with ammonia such that an equivalence ratio is rich upstream of the injector. Furthermore, in the ammonia operating mode 710, the method 700 may further include at step 718 providing, with the injector, solely air (e.g., no fuel provided by the injector) to the combustion chamber.

In the hydrogen operating mode 720, as shown in FIG. 7B, the one or more fuels is a hydrogen rich fuel. The hydrogen rich fuel may contain a majority of hydrogen, such as at least 50% hydrogen, or at least 60%, or at least 70% or at least 80%, or at least 90%. In some embodiments, the one or more fuels may be entirely hydrogen (e.g., 100% hydrogen, such that no other fuel is provided to the combustion chamber). In such operating modes, the method 700 may include, at step 722, providing, with the plurality of outer fuel nozzles, a first mixture of hydrogen and air. Additionally, in such operating modes, the method 700 may include, at step 724, providing, with the center fuel nozzle, solely air (e.g., not fuel and not a fuel/air mixture) to the combustion chamber. Further, the method 700 may include, at step 726, providing, with the venturi injector, solely air (e.g., not fuel and not a fuel/air mixture) to the combustion chamber. Particularly, in the hydrogen operating mode 720, the venturi injector may provide minimal air to the combustion chamber, such as purge air. Purge air may be enough air to prevent ingestion of combustion gases into the venturi injector but not enough air to significantly impact the combustion reaction (such as between about 0.1% and about 5% of the total air injected into the combustion chamber). Lastly, in the hydrogen operating mode 720, the method 700 may include providing, with the injector, a second mixture of hydrogen and air to the combustion chamber. The second mixture of hydrogen and air may have the same mixture composition (e.g., the same weight percentage of air and fuel) as the first mixture, or the second mixture may have a different mixture composition.

In the natural gas operating mode 730, as shown in FIG. 7C, the one or more fuels is a natural gas rich fuel. The natural gas rich fuel may contain a majority of natural gas, such as at least 50% natural gas, or at least 60%, or at least 70% or at least 80%, or at least 90%. In some embodiments, the one or more fuels may be entirely natural gas (e.g., 100% natural gas, such that no other fuel is provided to the combustion chamber). In exemplary implementations, the natural gas may be methane. In such operating modes, the method 700 may include, at step 732, providing, with the plurality of outer fuel nozzles, a first mixture of natural gas and air. Additionally, the method 700 may include, at step 734, providing, with the center fuel nozzle, the first mixture of natural gas and air. That is, the same mixture of fuel and air may be provided to the combustion chamber via the outer fuel nozzles and the center fuel nozzle.

Further, in such implementations, the method 700 may include, at step 736, providing, with the venturi injector, a second mixture of natural gas and air to the combustion chamber. The second mixture of natural gas and air may have the same mixture composition (e.g., the same weight percentage of air and fuel) as the first mixture, or the second mixture may have a different mixture composition. Lastly, the method 700 may include, at step 738, providing, with the injector, a third mixture of natural gas and air to the combustion chamber. The third mixture of natural gas and air may have the same mixture composition (e.g., the same weight percentage of air and fuel) as the first mixture and the second mixture, or the third mixture may have a different mixture composition than the first mixture and the second mixture. Notably, in the natural gas operating mode 730, the injector may not need to extend into the combustion chamber (i.e., the injector 108 may not include the injection body 138).

In some implementations, particularly when the gas turbine engine is starting and increasing load, the combustor may transfer from operation on a first fuel to operation on a second fuel or to one of the operating modes 710, 720, 730. For example, in such implementations, the method may include providing a first fuel of the one or more fuels via one or more of the plurality of outer fuel nozzles, the center fuel nozzle, the venturi injector, and the injector until the gas turbine is at between about 30% and about 70% load, or such as between about 40% and about 60% load, or such as about 50% load. Subsequently, the method may include transferring from providing the first fuel of the one or more fuels to providing a second fuel of the one or more fuels to one or more of the plurality of outer fuel nozzles, the center fuel nozzle, the venturi injector, and the injector. Particularly, the first fuel may be natural gas, and the second fuel is one of entirely ammonia or a mixture of ammonia and hydrogen. That is, the combustor may be started on natural gas and fired until the gas turbine reaches about 50% load. At this point, the natural gas may be terminated, and the combustor may be supplied with either entirely ammonia (e.g., 100% ammonia) or a mixture of about 60%-80% ammonia with a remainder of hydrogen (e.g., 20%-40% hydrogen).

As used herein, "air" may refer to ambient air or air mixed with exhaust gases of the gas turbine engine (or another gas turbine engine), such as in an exhaust gas recirculating system. Particularly, "air" may refer to the oxidants traveling through the gas turbine engine, e.g., received by the compressor section and conveyed to the combustion section for combustion with fuel.

Figure 8:
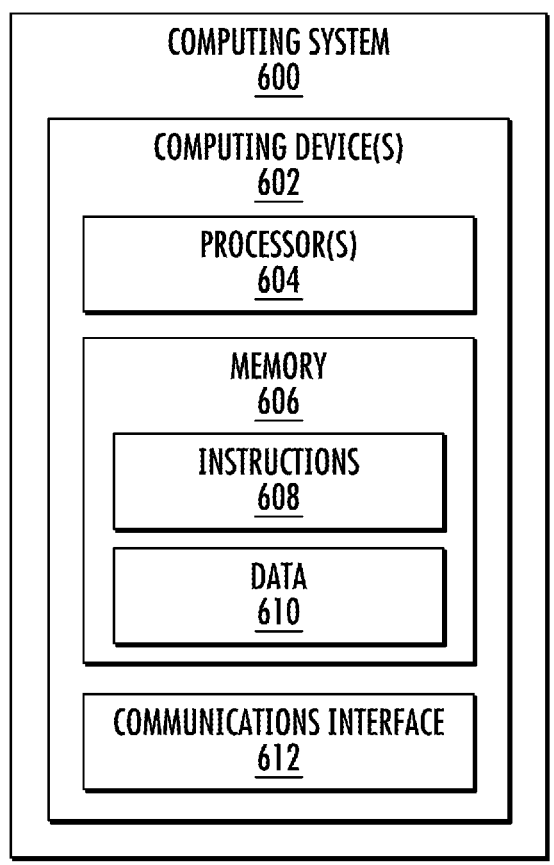
FIG. 8 is a schematic illustration of an exemplary computing system used to implement the aspects of the methods of the present disclosure.

FIG. 8 provides a block diagram of an example computing system 600. The computing system 600 can be used to implement the aspects disclosed herein. The computing system 600 can include one or more computing device(s) 602. The controller 200 described above with reference to FIG. 2 may be constructed and may operate in a same or similar manner as one of the computing devices 602, for example.

As shown in FIG. 8, the one or more computing device(s) 602 can each include one or more processor(s) 604 and one or more memory device(s) 606. The one or more processor (s) 604 can include any suitable processing device, such as a microprocessor, microcontroller, integrated circuit, logic device, or other suitable processing device. The one or more memory device(s) 606 can include one or more computer-readable media, including, but not limited to, non-transitory computer-readable medium or media, RAM, ROM, hard drives, flash drives, and other memory devices, such as one or more buffer devices.

The one or more memory device(s) 606 can store information accessible by the one or more processor(s) 604, including computer-readable or computer-executable instructions 608 that can be executed by the one or more processor(s) 604. The instructions 608 can be any set of instructions or control logic that when executed by the one or more processor(s) 604, cause the one or more processor(s) 604 to perform operations. The instructions 608 can be software written in any suitable programming language or can be implemented in hardware. In some embodiments, the instructions 608 can be executed by the one or more processor(s) 604 to cause the one or more processor(s) 604 to perform operations.

The memory device(s) 606 can further store data 610 that can be accessed by the processor(s) 604. For example, the data 610 can include sensor data such as engine parameters, model data, logic data, etc., as described herein. The data 610 can include one or more table(s), function(s), algorithm(s), model(s), equation(s), etc., according to example embodiments of the present disclosure.

The one or more computing device(s) 602 can also include a communications interface 612 used to communicate, for example, with the other components of the gas turbine engine. The communications interface 612 can include any suitable components for interfacing with one or more network(s), including, for example, transmitters, receivers, ports, controllers, antennas, or other suitable components.

The technology discussed herein makes reference to computer-based systems and actions taken by and information sent to and from computer-based systems. It will be appreciated that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems.

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they include structural elements that do not differ from the literal language of the claims, or if they include equivalent structural elements with insubstantial differences from the literal language of the claims.

Further aspects of the invention are provided by the subject matter of the following clauses:

A combustor comprising: a combustion liner defining a combustion chamber that extends along an axial centerline from a forward end to an aft end; a center fuel nozzle extending along the axial centerline at least partially within the combustion chamber; a plurality of outer fuel nozzles surrounding the center fuel nozzle, the plurality of outer fuel nozzles terminating at the forward end; a venturi injector positioned within the combustion chamber downstream of the center fuel nozzle; and an injector positioned within the combustor downstream of the venturi injector.

The combustor as in any preceding clause, wherein the center fuel nozzle, the plurality of outer fuel nozzles, the venturi injector, and the injector are fluidly coupled to a fuel supply system.

The combustor as in any preceding clause, wherein the fuel supply system includes at least two of an ammonia supply, a hydrogen supply, and a natural gas supply.

The combustor as in any preceding clause, wherein the venturi injector includes a venturi nozzle body having a first slanted wall, a second slanted wall, and an apex at an intersection between the first slanted wall and the second slanted wall, the first slanted wall extending towards the axial centerline of the combustor as the first slanted wall extends from the combustion liner to the apex, the second slanted wall extending away from the axial centerline of the combustor as the second slanted wall extends from the apex to the combustion liner.

The combustor as in any preceding clause, wherein the venturi injector includes outlets defined in the second slanted wall of the venturi nozzle body.

The combustor as in any preceding clause, wherein the injector extends radially into the combustion chamber.

The combustor as in any preceding clause, wherein the injector includes an airfoil-shaped injection body that extends into the combustion chamber, the airfoil-shaped injection body having a leading edge, a trailing edge, and a side surface extending between the leading edge and the trailing edge, and wherein one or more injection ports are defined on the side surface of the airfoil-shaped injection body.

The combustor as in any preceding clause, wherein each of the plurality of outer fuel nozzles is a bundled tube fuel nozzle defining a fuel plenum with a forward plate, an aft plate, an annular body extending between the forward plate and the aft plate, and wherein a plurality of tubes extends from the forward plate through the fuel plenum to the aft plate.

The combustor as in any preceding clause, wherein the center fuel nozzle is a swirler nozzle having an outer tube, a center body, and vanes extending between the center body and the outer tube.

A method of operating a combustor in a gas turbine engine on one or more fuels from a fuel supply system, the combustor comprising a combustion liner that defines a combustion chamber extending between a forward end and an aft end, the method comprising: providing, with a plurality of outer fuel nozzles, at least one of air and the one or more fuels to the combustion chamber at the forward end; providing, with a center fuel nozzle, at least one of air and the one or more fuels to the combustion chamber downstream of the forward end; providing, with a venturi injector, at least one of air and the one or more fuels to the combustion chamber downstream of the center fuel nozzle; and providing, with an injector, at least one of air and the one or more fuels to the combustion chamber downstream of the venturi injector, wherein at least one of the plurality of outer fuel nozzles or the center fuel nozzle provides fuel.

The method as in any preceding clause, further comprising: providing a first fuel of the one or more fuels via one or more of the plurality of outer fuel nozzles, the center fuel nozzle, the venturi injector, and the injector until the gas turbine engine is at between about 30% and about 70% load; and transferring from providing the first fuel of the one or more fuels to providing a second fuel of the one or more fuels to one or more of the plurality of outer fuel nozzles, the center fuel nozzle, the venturi injector, and the injector.

The method as in any preceding clause, wherein the first fuel is natural gas, and wherein the second fuel is one of an ammonia rich fuel or a mixture of ammonia and hydrogen.

The method as in any preceding clause, wherein the first fuel is natural gas, and wherein the second fuel is a hydrogen rich fuel.

The method as in any preceding clause, wherein the one or more fuels is ammonia rich fuel, and wherein the method further comprises: providing, with the center fuel nozzle, one of the ammonia rich fuel or a first mixture of ammonia and air to the combustion chamber; providing, with the plurality of outer fuel nozzles, one of solely air or a second mixture of ammonia and air; providing, with the venturi injector, at least one of ammonia and air to the combustion chamber such that an equivalence ratio is between about 1.1 and 1.5 upstream of the injector; and providing, with the injector, solely air to the combustion chamber.

The method as in any preceding clause, wherein the one or more fuels is a hydrogen rich fuel, and wherein the method further comprises: providing, with the center fuel nozzle, solely air to the combustion chamber; providing, with the plurality of outer fuel nozzles, a first mixture of hydrogen and air; providing, with the venturi injector, solely air to the combustion chamber; and providing, with the injector, a second mixture of hydrogen and air to the combustion chamber.

The method as in any preceding clause, wherein the one or more fuels is a natural gas rich fuel, and wherein the method further comprises: providing, with the center fuel nozzle, a first mixture of natural gas and air; providing, with the plurality of outer fuel nozzles, the first mixture of natural gas and air; providing, with the venturi injector, a second mixture of natural gas and air to the combustion chamber; and providing, with the injector, a third mixture of natural gas and air to the combustion chamber.

The method as in any preceding clause, wherein the center fuel nozzle extends along an axial centerline of the combustor and at least partially within the combustion chamber.

The method as in any preceding clause, wherein the plurality of outer fuel nozzles surrounds the center fuel nozzle, and wherein the plurality of outer fuel nozzles terminates at the forward end.

What is claimed is:

1. A combustor comprising:
   a combustion liner defining a combustion chamber that extends along an axial centerline from a forward end to an aft end;
   an outer sleeve spaced apart from the combustion liner such that an annulus is defined between the combustion liner and the outer sleeve;
   a center fuel nozzle extending along the axial centerline at least partially within the combustion chamber;
   a plurality of outer fuel nozzles surrounding the center fuel nozzle, the plurality of outer fuel nozzles terminating at the forward end;
   a venturi injector positioned within the combustion chamber downstream of the center fuel nozzle, the venturi injector defining an interior that fluidly connects the annulus and the combustion chamber; and
   an injector positioned in the combustor downstream of the venturi injector, wherein the injector extends radially into the combustion chamber beyond an apex of the venturi injector; and
   wherein the venturi injector includes a venturi nozzle body having a first slanted wall, a second slanted wall, and the apex at an intersection between the first slanted wall and the second slanted wall, the first slanted wall extending towards the axial centerline of the combustor as the first slanted wall extends from the combustion liner to the apex, the second slanted wall extending away from the axial centerline of the combustor as the second slanted wall extends from the apex to the combustion liner, wherein the first slanted wall and the second slanted wall are fully downstream of the center fuel nozzle.

2. The combustor as in claim 1, wherein the center fuel nozzle, the plurality of outer fuel nozzles, the venturi injector, and the injector are fluidly coupled to a fuel supply system.

3. The combustor as in claim 2, wherein the fuel supply system includes at least two of an ammonia supply, a hydrogen supply, and a natural gas supply.

4. The combustor as in claim 1, wherein the venturi injector includes outlets defined in the second slanted wall of the venturi nozzle body.

5. The combustor as in claim 4, wherein the second slanted wall faces a leading edge of the injector.

6. The combustor as in claim 1, wherein the venturi injector is fluidly connected to a fuel supply conduit such that an interior receives fuel from the fuel supply conduit.

7. The combustor as in claim 1, wherein the injector includes an airfoil-shaped injection body that extends into the combustion chamber, the airfoil-shaped injection body having a leading edge, a trailing edge, and a side surface extending between the leading edge and the trailing edge, and wherein one or more injection ports are defined on the side surface of the airfoil-shaped injection body.

8. The combustor as in claim 1, wherein each of the plurality of outer fuel nozzles is a bundled tube fuel nozzle defining a fuel plenum with a forward plate, an aft plate, an annular body extending between the forward plate and the aft plate, and wherein a plurality of tubes extends from the forward plate through the fuel plenum to the aft plate.

9. The combustor as in claim 1, wherein the center fuel nozzle is a swirler nozzle having an outer tube, a center body, and vanes extending between the center body and the outer tube.

10. A method of operating a combustor in a gas turbine engine on one or more fuels from a fuel supply system, the combustor comprising a combustion liner that defines a combustion chamber extending between a forward end and an aft end, the method comprising:
   providing, with a plurality of outer fuel nozzles, at least one of air and the one or more fuels to the combustion chamber at the forward end;
   providing, with a center fuel nozzle, at least one of air and the one or more fuels to the combustion chamber downstream of the forward end;
   providing, with a venturi injector, air and the one or more fuels to the combustion chamber downstream of the center fuel nozzle; and
   providing, with an injector, at least one of air and the one or more fuels to the combustion chamber downstream of the venturi injector, wherein at least one of the plurality of outer fuel nozzles or the center fuel nozzle provides fuel, and wherein the injector extends radially into the combustion chamber beyond an apex of the venturi injector; and
   wherein the venturi injector includes a venturi nozzle body having a first slanted wall, a second slanted wall, and the apex at an intersection between the first slanted wall and the second slanted wall, the first slanted wall extending towards an axial centerline of the combustor as the first slanted wall extends from the combustion liner to the apex, the second slanted wall extending away from the axial centerline of the combustor as the second slanted wall extends from the apex to the combustion liner, wherein the first slanted wall and the second slanted wall are fully downstream of the center fuel nozzle.

11. The method as in claim 10, further comprising:
   providing a first fuel of the one or more fuels via one or more of the plurality of outer fuel nozzles, the center fuel nozzle, the venturi injector, and the injector until the gas turbine engine is at between about 30% and about 70% load; and
   transferring from providing the first fuel of the one or more fuels to providing a second fuel of the one or more fuels to one or more of the plurality of outer fuel nozzles, the center fuel nozzle, the venturi injector, and the injector.

12. The method as in claim 11, wherein the first fuel is natural gas, and wherein the second fuel is one of an ammonia rich fuel or a mixture of ammonia and hydrogen.

13. The method as in claim 11, wherein the first fuel is natural gas, and wherein the second fuel is a hydrogen rich fuel.

14. The method as in claim 10, wherein the one or more fuels is ammonia rich fuel, and wherein the method further comprises:
   providing, with the center fuel nozzle, one of the ammonia rich fuel or a first mixture of ammonia and air to the combustion chamber;
   providing, with the plurality of outer fuel nozzles, one of solely air or a second mixture of ammonia and air;
   providing, with the venturi injector, at least one of ammonia and air to the combustion chamber such that an equivalence ratio is between about 1.1 and 1.5 upstream of the injector; and
   providing, with the injector, solely air to the combustion chamber.

15. The method as in claim 10, wherein the one or more fuels is a hydrogen rich fuel, and wherein the method further comprises:
   providing, with the center fuel nozzle, solely air to the combustion chamber;
   providing, with the plurality of outer fuel nozzles, a first mixture of hydrogen and air;
   providing, with the venturi injector, solely air to the combustion chamber; and
   providing, with the injector, a second mixture of hydrogen and air to the combustion chamber.

16. The method as in claim 10, wherein the one or more fuels is a natural gas rich fuel, and wherein the method further comprises:
   providing, with the center fuel nozzle, a first mixture of natural gas and air;
   providing, with the plurality of outer fuel nozzles, the first mixture of natural gas and air;
   providing, with the venturi injector, a second mixture of natural gas and air to the combustion chamber; and
   providing, with the injector, a third mixture of natural gas and air to the combustion chamber.

17. The method as in claim 10, wherein the center fuel nozzle extends along the axial centerline of the combustor and at least partially within the combustion chamber.

18. The method as in claim 10, wherein the plurality of outer fuel nozzles surrounds the center fuel nozzle, and wherein the plurality of outer fuel nozzles terminates at the forward end.

* * * * *